Aug. 6, 1957 W. F. MOSELEY 2,801,497
AUTOMOTIVE GRINDING AND POLISHING APPARATUS FOR
CYLINDRICAL WORKPIECES
Filed Feb. 18, 1957 2 Sheets-Sheet 1
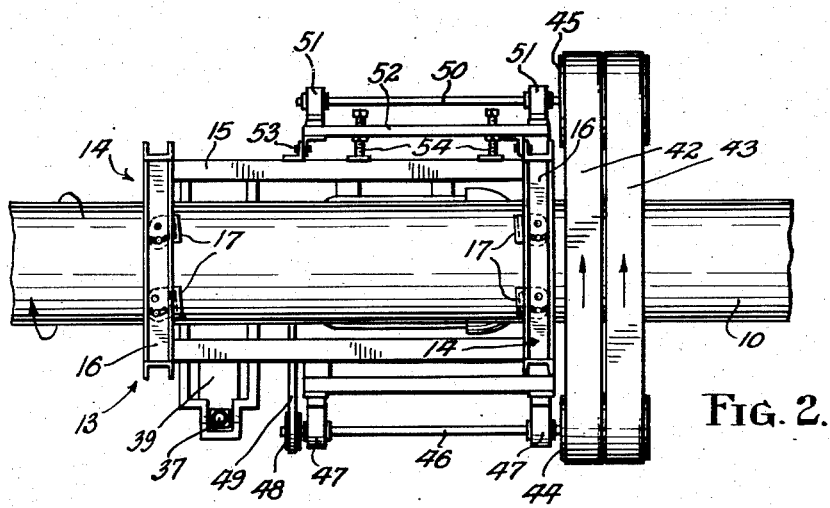
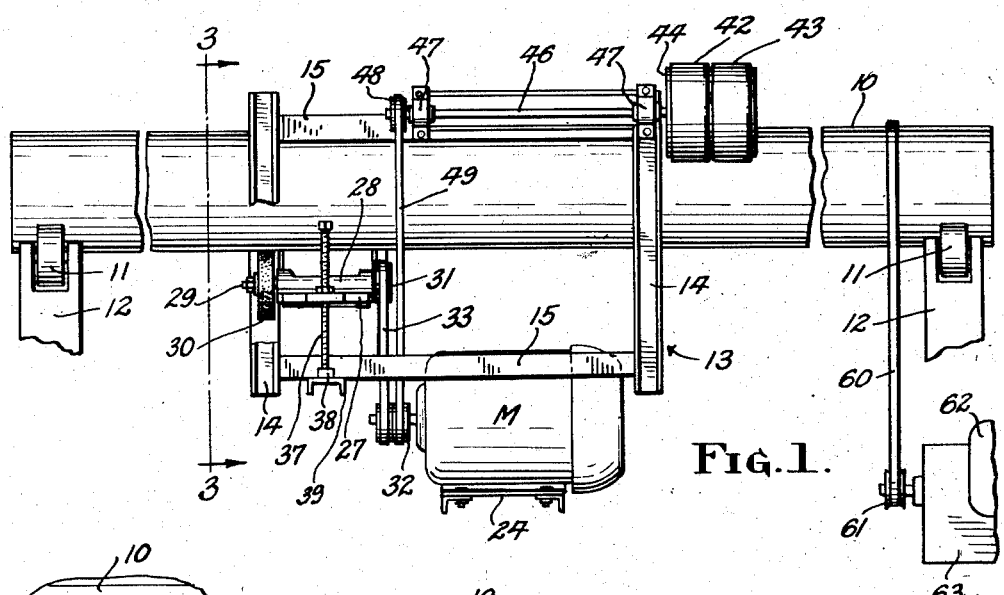
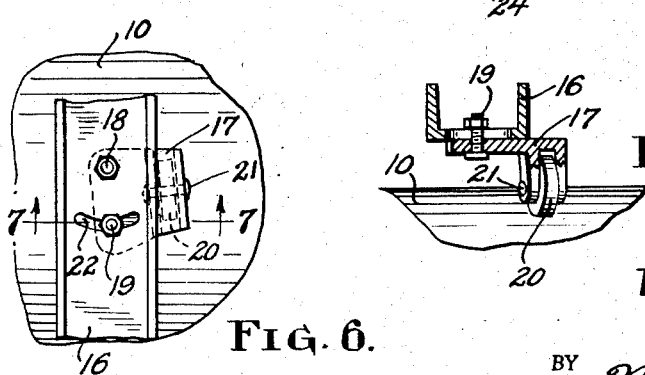
INVENTOR
W. F. Moseley
BY
ATTORNEY Aug. 6, 1957  W. F. MOSELEY  2,801,497
AUTOMOTIVE GRINDING AND POLISHING APPARATUS FOR
CYLINDRICAL WORKPIECES
Filed Feb. 18, 1957  2 Sheets—Sheet 2

INVENTOR
W. F. Moseley
BY
ATTORNEY

United States Patent Office 2,801,497
Patented Aug. 6, 1957

2,801,497

AUTOMOTIVE GRINDING AND POLISHING APPARATUS FOR CYLINDRICAL WORKPIECES

Wallace Frederick Moseley, Columbus, Ohio, assignor to Plunger Lift Elevators, Inc., Columbus, Ohio, a corporation of Ohio Application February 18, 1957, Serial No. 640,795

10 Claims. (Cl. 51—3)

This invention relates to an apparatus designed to accurately grind and polish the outer peripheral surface of relatively elongated cylindrical work pieces, particularly relatively long cylindrical tubing or shafts which are used as hydraulic elevator plungers.

One important aim is to provide such an apparatus which is adapted to be suspended and balanced on the work or plunger while the latter is rotated and which will automatically traverse the work piece during grinding and polishing operations without necessitating the use of stationary guide means or motive power to drive the apparatus in its work piece traversing movement.

Another object is to provide an apparatus of this character which comprises an open-ended carriage frame adapted to be bodily suspended on a rotary, horizontally positioned work piece by means of a plurality of spaced roller elements set at an angle to the axis of the work piece so that rotation of the work piece causes the carriage frame to traverse the work piece, and wherein the carriage frame is provided with suitable abrading means engageable with the outer peripheral surfaces of the work piece to accurately and smoothly grind and polish such work piece to a desired size and finish.

Further, an object is to provide means whereby the speed of traversing movement of the apparatus relative to the work piece may be simply and easily adjusted in accordance with desired speeds of operation.

Yet, another object of the invention is to provide an automotive grinding and polishing machine of the character aforesaid which is adaptable for use in connection with cylindrical work pieces of varying sizes and diameters without requiring time-consuming and expensive structural modification of the apparatus.

Various additional objects and advantages will become apparent from the following description taken in connection with the accompanying drawings showing one embodiment by way of example, and wherein:

Fig. 1 is a side elevation partly broken away, showing the novel apparatus mounted in operative position on a hydraulic elevator plunger;

Fig. 2 is a plan view of the apparatus mounted on a hydraulic plunger;

Fig. 6 is an enlarged fragmentary plan view illustrating the mounting of one of the traction rollers; and Fig. 7 is a cross sectional view taken on the line 7—7 of Fig. 6.

Figure 3:
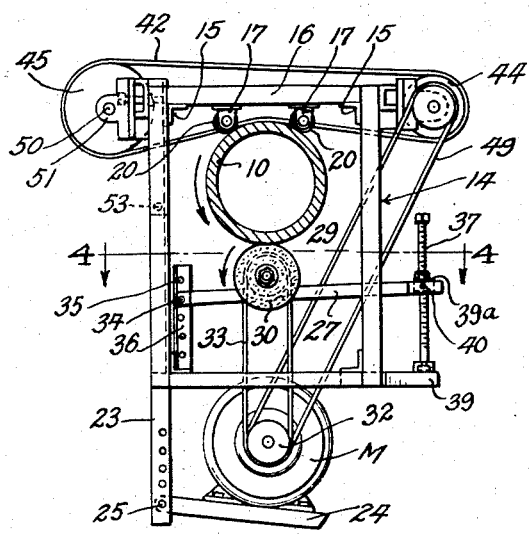
Fig. 3 is a cross sectional view taken on the line 3—3 of Fig. 1.
Figure 4:
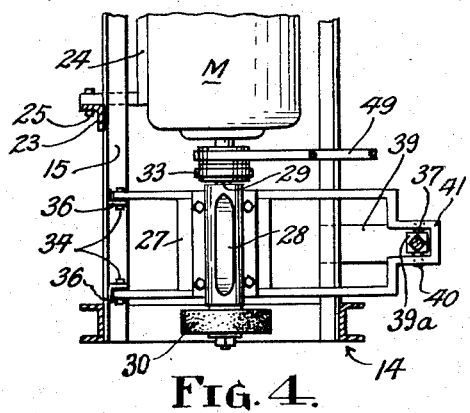
Fig. 4 is a cross section taken on the line 4—4 of Fig. 3 on a slightly enlarged scale.
Figure 5:
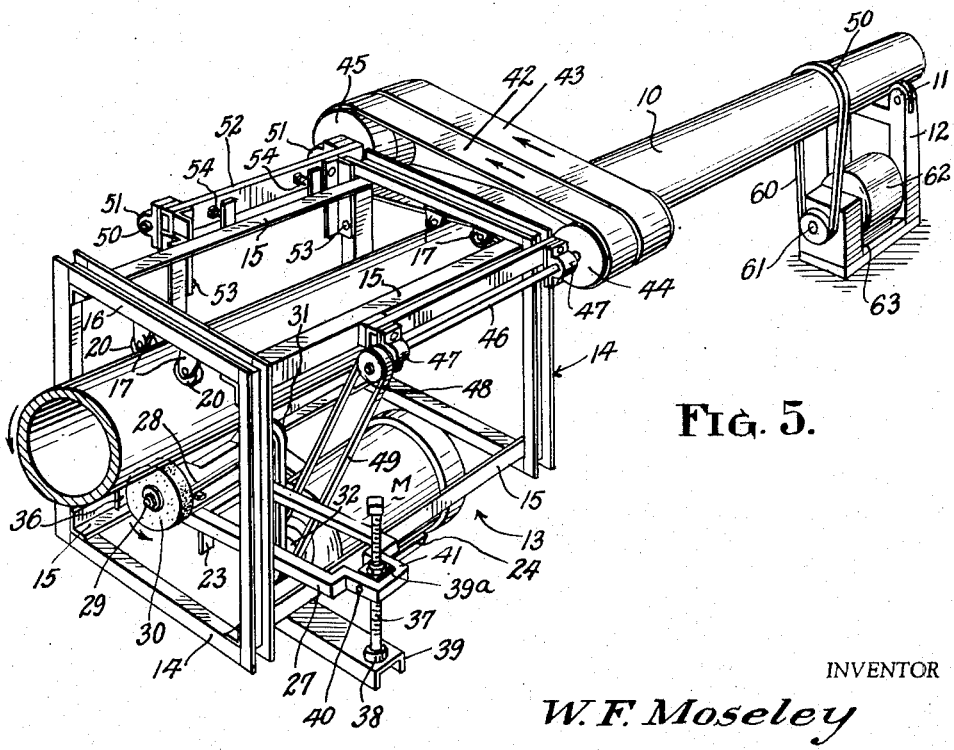
Fig. 5 is a perspective view of the apparatus operatively mounted on a hydraulic elevator plunger to grind and polish the same.

Referring specifically to the drawings wherein like reference characters designate like or corresponding parts throughout the different views, 10 designates a hydraulic elevator plunger of round, cold drawn, seamless tubing which is used in a size quite large and, for instance, three to twelve inches in diameter and from six to fifty feet in length. The present invention is particularly useful in grinding, polishing and otherwise sizing and finishing such a plunger, but at the same time, the invention is not so limited because the plunger is to be taken as conventional and representative of any round or cylindrical work or stock. Said plunger or other work is supported at any suitable elevation as on cradle rollers 11 of stands 12, one stand being located at each end of the plunger, and the stands usually being portable to accommodate plungers or work pieces of various diameters and lengths.

Disengageably mounted, balanced and suspended on said plunger or work piece 10 is the apparatus constituting my invention, the same employing a suitable carriage or frame 13 which is fabricated, skeleton like preferably from desirable metallic elements, and mainly from such elements as two parallel open square-end frames 14 bridged adjacent each corner by a longitudinally extending angle element 15 welded or otherwise secured at its ends to said frames 14. The uppermost bars of said frames 14 are designated 16 and each has a pair of brackets 17 bolted at 18 and 19 against its under surface, the brackets carrying rollers 20 pivoted on pins 21. The nuts of said bolts 18 and 19 may be loosened to permit pivotal adjustment of the brackets to dispose the rollers 20 at various desired angles so that the carriage will travel longitudinally along the plunger 10 at variable speeds. The slots 22 in bars 16 through which said bolts 19 pass, are preferably enlarged or arcuate to enable swinging adjustment of the brackets on bolts 18.

The frame 13 has depending bar means 23 to which a base 24 is pivoted by bolt means 25 adjustably engaging any of a series of holes 26, and which base carries and pivotally mounts a power means such as an electric or other motor M. Above said motor is a support 27 carrying a bearing 28 in which a shaft or arbor 29 is journaled which arbor carries an abrading or grinding wheel 30 for engagement with the outer surface of said plunger. This wheel 30 is representative of but one of a series of two or more wheels, all differing in the degree of coarseness, which may be selectively used if desired. Shaft 29 has a pulley 31 and is driven from said motor M through one part of a double pulley 32, and a belt 33, trained over both pulleys. Said platform 27 at one end is pivoted by bolts 34 mounted in any one of a series of holes 35 in upright brackets 36 rising from one of the horizontal bars 15. The support 27 may be adjusted on the pivotal axis of bolts 34 through the rotation of a vertically disposed screw-threaded rod 37 journaled in a socket 38 fixed on a lug 39 extending from one of the horizontal bars 15. The screw threads of said rod 37 are engaged by those of a nut 39a pivotally mounted by trunnions 40 journaled in a yoke 41 of support 27. Turning of said screw rod 37 will thus raise or lower the support 27 as desired to control the depth of cut of the wheel 30 on the plunger or work 10.

Transversely movable across the plunger or work 10 is a pair of abrasive polishing belts 42 and 43 for polishing the surface of such plunger following the abrading or grinding action by the wheel 30.

The abrasive grits of such belts are preferably of different size, the belt 42 having the coarser grits being placed in such position that it will engage the work first, thus effecting a degree of abrading intermediate or between the coarse abrading by wheel 30 and the polishing abrading by the remaining belt 43. The abrasive belts 42 and 43 are trained over pulleys 44 and 45. Pulley 44 is keyed to a shaft 46 journaled in bearings 47 suitably mounted on the adjacent longitudinal bar 15 and the shaft 46 has a pulley 48 keyed thereto. A belt 49 is trained over pulley 48 and part of pulley 32 in order to drive said belts 42 and 43 from the motor M.

The pulley 45 is keyed to a shaft 50 which is journaled in bearing elements 51 of an elongated bar 52 which thus form a bearing structure pivoted at 53 to the frame 13. Screw rods 54 are threaded in said bar 52 with their free ends engaging the adjacent longitudinal bar 15 so that when they are turned by engagement of a tool with their heads, the bearing structure will correspondingly pivotally adjust to control the tension of abrading belts 42 and 43 and their operative engagement with the work 10.

All drive belts mentioned are preferably of the V-type with the associated pulleys preferably having correspondingly shaped peripheral grooves engaged thereby.

As one means of rotating the plunger or work 10, a belt 60, through a pulley 61, may be driven by a conventional motor 62 mounted on a portable stand 63. The belt passes over said plunger and is in frictional driving engagement therewith.

In operation, with the plunger or work 10 rotating through the drive from motor 62, pulley 61 and belt 60, and the carriage 13 mounted thereon as shown, rollers 20 will cause the latter to traverse the work in a direction and speed governed by the angle at which the rollers are set with respect to the longitudinal axis of the work. The coarsest grinding is effected by the wheel 30 so as to reduce the diameter of the work to a given desired size. The wheel 30 in use, is maintained against the work 10 with the requisite pressure under control of screw rod 37 which is operable to swing platform 27 on its pivotal axis 34. Adjustment of rod 37 will also disengage the wheel 30 from the work. Motor M drives said wheel 30 through pulley 32, belt 33, pulley 31 and shaft 29. Said motor M through pulley 32, belt 49, pulley 48, shaft 46 and pulley 44 also drives the endless abrading belts 42 and 43, the tension thereof being regulated through the swinging adjustment of bracket 52 through adjustment of bolts 54, operation being controlled so that after the abrading by wheel 30, belts 42 and 43 will abrade the work. Complete disengagement of the belts 42 and 43 from the work may be effected through the loosening of said bolts 54.

If desired, the grinding wheel only may be employed in an initial pass over the work, without the polishing belts 42 and 43 during such initial pass. However, both the grinding wheel and polishing belts may be employed and used simultaneously to increase speed of production.

Various changes may be resorted to within the spirit and scope of the invention as defined by the appended claims.

I claim:

1. Apparatus for abrading a cylindrical body while the latter is rotating, comprising a carriage arranged to be suspended on the body and having means disposed in position for engagement with the body to cause traversing movement of the carriage along the latter through said rotation, abrading means on the carriage in position to engage the periphery of the body, and power means on the carriage to drive said abrading means.

2. Apparatus for abrading a cylindrical body while the latter is rotating, comprising a carriage arranged to be suspended on the body and having means disposed in position for engagement with the outer surface of the body to cause traversing movement of the carriage along the latter through said rotation, a first abrading means on the carriage in position to engage the periphery of the body, said abrading means being rotatable, a second abrading means disposed above and in relatively spaced relation to said first abrading means, and power means on the carriage to drive both of said abrading means.

3. Apparatus for abrading a cylindrical body while the latter is rotating, comprising a carriage arranged to be supported solely by the body and having roller means disposed in position for engagement with the upper portion of the body to directly suspend the carriage thereon and arranged to cause movement of the carriage along the body upon rotation of the latter, abrading means on the carriage below and spaced from said roller means, means operable to position said abrading means against the lower portion of the body, and power means on the carriage to drive said abrading means.

4. Apparatus according to claim 3, wherein said roller means comprises a plurality of laterally spaced apart rollers, and the center of gravity of said apparatus passes between said rollers and through both said abrading means and power means.

5. Apparatus for abrading a cylindrical body while the latter is rotating, comprising a carriage adapted to be suspended on the body and having means disposed in position for engagement with the body to cause traversing movement of the carriage along the latter through said rotation, abrading means on the carriage in position to engage the periphery of the body, said first means being rollers to suspend the apparatus on said body, an abrading belt carried by and extending transversely of said carriage and engageable with the body at a position spaced longitudinally of said carriage from said abrading means, and means on the carriage to drive both said abrading means and said abrading belt.

6. Apparatus according to claim 5, including means operable to tension said belt with respect to the body.

7. Apparatus for abrading a cylindrical body while the latter is rotating comprising a carriage arranged to be suspended on the body and having means disposed for engagement with the body from above to cause traversing movement of the carriage along the latter through rotation thereof, abrading means on the carriage in position to engage the periphery of the body from below, a platform on said carriage on which said abrading means is mounted, means to adjust the platform relatively on said frame to move the abrading means relative to the body, power means on the carriage below said abrading means, and means to drive said abrading means from the power means.

8. Apparatus according to claim 7, wherein said abrading means comprises a rotary grinding wheel, and wherein said platform is pivoted to said frame, and wherein said means to adjust said platform comprises an adjusting screw means disposed between the platform and carriage and operable to vary the position of the platform and accordingly that of the wheel.

9. Apparatus for abrading the peripheral surface of a rotating, cylindrical work piece comprising an open-ended carriage frame arranged to be suspended bodily on the work piece when the latter occupies a substantially horizontal position; a plurality of relatively spaced rollers carried by said frame for engagement with the upper peripheral surface of the work piece, said rollers having the axes thereof disposed at an angle with respect to the axis of a work piece upon which said frame is suspended to cause traversing movement of said frame longitudinally of said work piece upon axial rotation of the latter; a rotary grinding wheel carried in said frame and engageable with the under peripheral surface of the work piece; and an electric motor carried by said frame and drivingly connected with said grinding wheel for rotating the latter.

10. Apparatus as defined in claim 9, including means connected with said rollers for adjusting the angle of the axes of said rollers relative to the axis of a work piece upon which said frame is suspended, whereby to vary the speed of traversing movement of said carriage frame relative to the work piece.

References Cited in the file of this patent
UNITED STATES PATENTS
2,751,728  Petit _____ June 26, 1956